Jan. 19, 1971     D. L. DOUGLAS ET AL     3,556,851
WATER-ACTIVATABLE DRY-CHARGED LEAD-ACID STORAGE CELLS
Filed Dec. 12, 1968
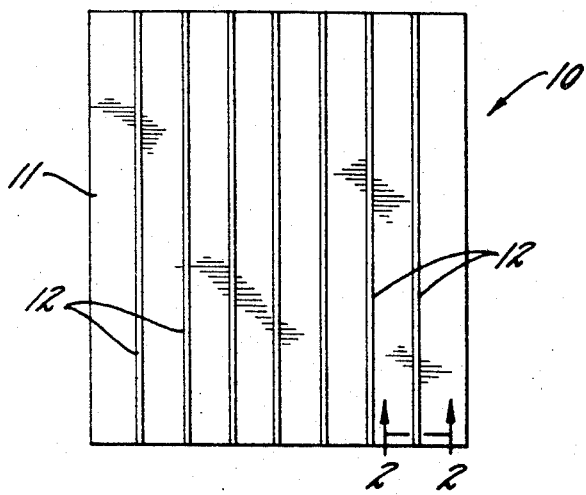
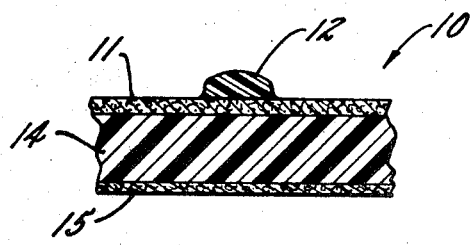
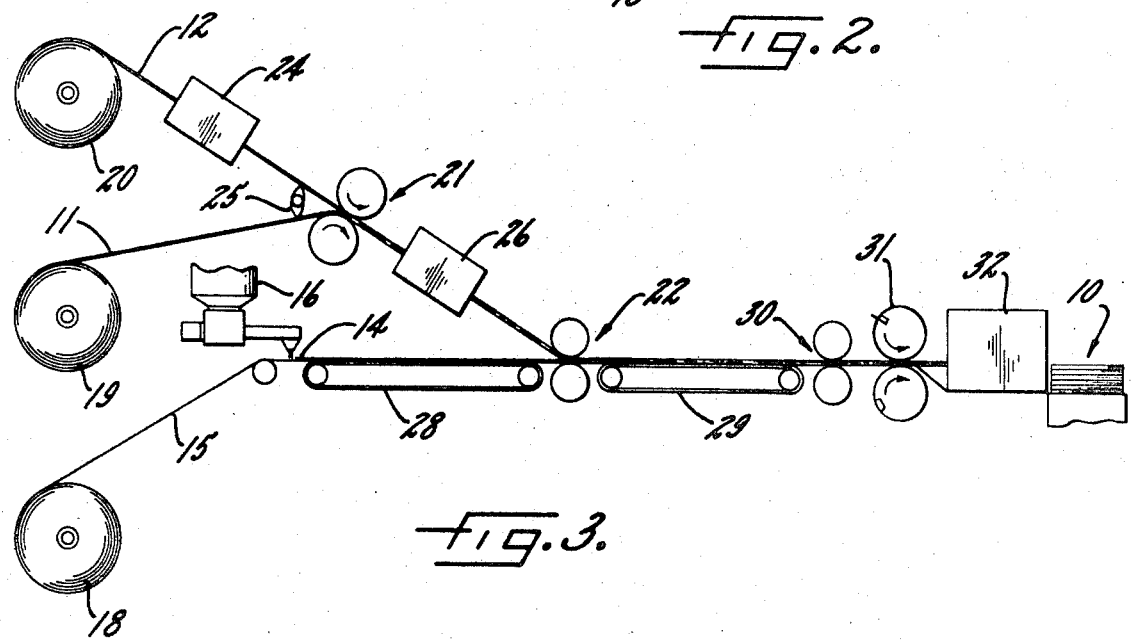
INVENTORS.
DAVID L. DOUGLAS,
HENRY J. BANAS
BY Wolfe, Hubbard, Voit & Osann
ATTORNEYS.

3,556,851
WATER-ACTIVATABLE DRY-CHARGED LEAD-ACID STORAGE CELLS
David L. Douglas and Henry J. Banas, Minneapolis, Minn., assignors to Gould-National Batteries, Inc., St. Paul, Minn., a corporation of Delaware
Continuation-in-part of application Ser. No. 581,749, Sept. 26, 1966. This application Dec. 12, 1968, Ser. No. 783,264
Int. Cl. H01m 3/04, 9/00
U.S. Cl. 136—26         7 Claims

ABSTRACT OF THE DISCLOSURE

Separators for water-activatable, dry-charged, lead-acid storage batteries comprising a sheet of polyelectrolyte complex of ionically bonded polycationic and polyanionic organic resins, and an auxiliary separator to space the polyelectrolyte from the positive plates. The polyelectrolyte contains concentrated sulfuric acid to provide a sulfuric acid electrolyte when water is added to activate the battery.

---

This is a continuation-in-part of application Ser. No. 581,749 filed Sept. 26, 1966.

This invention relates to separators for secondary cells, or storage batteries, particularly of the lead-acid type. More specially, the invention is primarily concerned with providing improved separators for dry-charged lead-acid secondary cells activated by the addition of water.

Lead-acid storage batteries, having positive electrodes of lead peroxide, negative electrodes of sponge metallic lead, and as an electrolyte an aqueous solution of sulfuric acid, are the most widely employed of the secondary or storage cells. Customarily, lead-acid storage batteries are stored before installation and use in either the "wet charged" or the "dry charged" condition. In the former, the sulfuric acid electrolyte is maintained in the cell compartments and thus in contact with the plates, while dry-charged batteries are supplied, as the term suggests, with dry but active plates and with a separate container of sulfuric acid. In the latter case the user activates the battery by adding acid.

Although both wet and dry charged batteries are in wide spread use, each has well recognized limitations. Wet charged batteries lose capacity during standing, and consequently must be kept on trickle charge or else periodically recharged; this is accompanied by grid corrosion and sulfation, which may limit the life of the battery when it is placed in service. On the other hand, dry-charged batteries do not require recharging, but have the inconvenience of storing and handling sulfuric acid together with the likelihood of permanently damaging the plates by improper acid addition.

In our application Ser. No. 581,749, filed Sept. 26, 1966 lead-acid storage battery that is activated merely by the addition of water. We accomplished this, in large measure, by storing or immobilizing concentrated sulfuric acid within a gel-like polyelectrolyte complex of ionically bonded polycationic and polyanionic organic resins. The complexes retain the concentrated sulfuric acid and then release it upon the addition of water. The remaining gel is a tough microporous membrane that, when employed as a separator for the positive and negative plates or electrode possesses high ionic conductivity, prevents physical contact between the plates, minimizes lead dendrite formation, cushions the plate against mechanical shock and vibration, provides a compressible medium for retaining lead peroxide and sulfate on the plates, prevents antimony migration from the positive plate grids, and renders the battery substantially spill proof.

When using polyelectrolyte complexes to store sulfuric acid in water activated dry-charged batteries, it is generally desirable to accommodate all, or substantially all, of the acid requirements in the space occupied by conventionally-sized battery separators. This space is quite limited, particularly in automotive batteries where each of the twenty-two or so separators in each cell is only about 0.066 inch thick. As a result, the sulfuric acid in polyelectrolyte complexes must be highly concentrated.

This high concentration gives rise to several problems. First, with present day polyelectrolyte complexes the requisite proportion of acid to polyelectrolyte may be to high for optimum physical properties of the gel. At excessive acid concentrations the gel becomes physically weak both before and after water activation, with consequent loss of many desirable properties. Further, gels containing excessive sulfuric acid may undergo syneresis, causing liquid acid to leave the gel, migrate to the plates, and discharge the battery before use. Accordingly, an object of the present invention is to provide an improved polyelectrolyte complex type battery separator capable of accommodating large proportions of sulfuric acid but which, at the same time, has sufficient physical strength for effective service as a battery separator. A related object is to provide separators of the foregoing type which have sufficient strength for automatic cell and battery assembly.

Also, when employing sufuric acid-polyelectrolyte complexes for long term storage in the dry-charged condition, it is desirable to further insure that none of the acid in the separator can contact the cell electrodes. This is particularly important with respect to the lead peroxide positive electrodes, where premature contact with concentrated sulfuric acid degrades long term shelf life. It is therefore another object of the invention to provide an improved battery separator which effectively isolates acid-polyelectrolyte gel from the battery plates during storage and prior to activation.

Another object is to provide a sulfuric acid-polyelectrolyte complex separator which permits liquid electrolyte circulation within the cell during battery use. A further object is to provide such construction which permits sediment from the negative electrodes to fall clear of the electrodes and separator.

An additional object is to provide a simple and rugged separator construction which permits full advantage to be taken of the sulfuric acid-polyelectrolyte gel concept and at the same time is readily manufactured by continuous automatic equipment, is low in cost, and permits maxiumum utilization of the acid-polyelectrolyte features.

Briefly, in accordance with the invention, there is provided a separator for use with water activatable, dry-charged, lead-acid secondary cells that comprises two components, a main separator and an auxiliary separator. The main separator is a sheet of polyelectrolyte complex containing concentrated sulfuric acid to provide a sulfuric acid electrolyte when water is added to activate the cell, and the auxiliary separator is disposed between the polyelectrolyte separator and the position electrode or electrodes. This latter separator physically separates the acid-polyelectrolyte from the positive electrodes to prevent direct contact between the acid and the lead peroxide during storage and prior to activation. Further, it permits electrolyte circulation within the cell thus facilitating high cell capacity under severe conditions.

In the preferred embodiment, the auxiliary separator is a series of spaced strands or ridges bonded to a sheet of non-woven fabric, which is incorporated into or onto the main sulfuric acid and polyelectrolyte gel separator.

Further advantages and objects of the invention will become apparent from the following specification, which is to be read in conjunction with the drawings wherein:

FIG. 1 depicts a typical separator according to the invention, as shown in front view;

FIG. 2 is an enlarged cross-sectional view of a separator according to the invention; and FIG. 3 schematically depicts an apparatus for the continuous and automatic manufacture of separators according to FIG. 2.

The polyelectrolyte complexes with which the present invention is concerned have been described by others (Fouss, R. M., Sadek, H., Science, 110, 552 (1949); Michaels, Alan S., "Polyelectrolyte Complexes," Ind. and Eng. Chem. 57 No. 10, 32–40 (October 1965). These polyelectrolyte complexes are essentially ionically bonded networks composed of two organic resins, one having anionic groups (the polyanion) and the other cationic groups (the polycation). When properly formulated, the individual resins apparently react ionically to form a polymeric network that has, among other unusual properties, the ability to reversibly imbibe or absorb large amounts of sulfuric acid. Indeed, mixtures of 49 parts of 100% sulfuric acid and one part of certain polyelectrolytes have been prepared, although the more common range is below about 12:1, and a more useful range is below about 6:1, e.g. from 4 to about 5:1.

A wide variety of polyelectrolyte complexes has been made, although those of maximum present interest are those formed by interaction between a strongly acidic polyanion, e.g. a sulfonate, and a strongly basic polycation, e.g. quaternary ammonium groups. Thus, for example, polymers of sodium styrene sulfonate ("NASS") and of vinyl benzyl trimethyl ammonium chloride ("VBTAC") are exceptionally useful. Each polymer, by itself, has a synthetic organic polymeric structure which, without the respective ionic groups, would be a water insoluble film forming material. Each polymer or resin has a sufficiently high molecular weight to be solid, typically above about 50,000, and, by itself, has sufficient dissociable ionic groups associated with the polymeric structure to render the polymer water soluble or dispersable. Other polyelectrolyte complexes together with methods of forming them into suitable shapes, are described in the previously mentioned application Ser. No. 581,749.

Turning to FIG. 1, a frontal view of a separator 10 is depicted. The separator comprises a generally rectangular thin sheet, generally around 0.05 to about 0.06 inch thick, together with a series of spaced parallel strands or ridges 12 which are bonded to, and which extend on one side of, the separator sheet, namely the side next to the lead oxide positive electrode or plate.

Ordinarily, one separator is disposed between each plate in a cell, and in some instances a separator is positioned outside the cell pack and along the flat surface of the outside electrodes. A typical cell will ordinarily have one more negative than positive plate, and for example where a cell has eleven positive plates and twelve plates it will have 22 separators, 24 if two separators are placed outside the cell pack.

Other dimensions of the separator 10 are dictated by electrode size. In an illustrative battery, the military 6 TN battery, where the electrodes are 5⅝ inches by 5¹¹⁄₁₆ inches in frontal dimension, a suitable separator 10 will be 5⅝ inches by 5²⁷⁄₃₂ inches.

Referring to FIG. 2, an enlarged cross-sectional view is shown that portrays a preferred separator structure according to the invention. The separator 10 comprises four elements, namely a gel comprising the polyelectrolyte complex of ionically bonded polycationic and polyanionic organic resins and concentrated sulfuric acid 14, a positive-facing polyolefin fabric surface 11, an auxiliary separator on the positive-facing surface 11 shown as strands or ribs 12, and a negative facing surface of non-woven polyolefin fabric 15.

The acid-polyelectrolyte gel 14, prepared as described hereafter, serves both as a source of sulfuric acid to provide liquid electrolyte when water is added to the battery to activate the same, and also provides a permanent battery separator medium of exceptional characteristics with respect to electrical conductivity, the prevention of deleterious side reactions, and the like. However, when the gel 14 contains a large proportion of sulfuric acid, the auxiliary separator 12 prevents or minimizes contact between the acid (either in the polyelectrolyte gel or acid which has been exuded by syneresis) and the positive plates.

A typical acid-polyelectrolyte gel is composed of 13.2% by weight of a stoichiometric polyelectrolyte of NASS and VBTAC, 60.2% of 100% sulfuric acid, 24.6% water, and 2.0% of a finely divided acid-resistant thickening agent such as short fiberglass strands, short strands of acid resistant synthetic resins (e.g. Dylene), carbon black, or colloidal pyrogenic silica (e.g. Cab-O-Sil). Thickening agents permit higher ratios of sulfuric acid to polyelectrolyte.

The proportions are typical and illustrative but may, of course, be varied over wide limits. In the illustrative example above, the acid/polyelectrolyte complex weight ratio is 4.56, the acid being at a weight concentration of 71.1%. Substantially higher ratios, up to about 12:1, and acidities up to 105%, may be employed usefully, but there appears to be no advantage in using ratios substantailly above 6:1, with acidities of from 65 to about 100%.

The thickness of acid-polyelectrolyte complex separator 14 is selected to provide sufficient acid to afford all, or substantially all, the acid requirements of the storage battery when the battery, in a dry-charged condition, is activated by the addition of water. Accordingly, the higher the acid concentration the lower need be the necessary volume of acid-polyelectrolyte gel 14. Inasmuch as acid recovery from the acid-polyelectrolyte complex is virtually 100%, the thickness of gel 14 can be calculated quite accurately. In the illustrative battery, this thickness is about 0.045 inch.

To further assist in providing a physically strong separator structure that is capable of withstanding handling during manufacture, shelf storage, and battery use, a pair of foraminous sheets 11, 15 are provided, one on each side of the acid-polyelectrolyte complex gel 14. The positive facing sheet 11 and the positive-facing sheet 15 are each advantageously made of non-woven fabric, such as, for example, a spun bonded polypropylene or polyethylene felt made by extruding, bonding, and subsequently calendaring the corresponding polyolefin. Such materials are available commercially (Du Pont's Typar polypropylene and Tyvek polyethylene, Kendall's SM 96.3, etc.), and are available in a variety of thicknesses. It has been found preferable that, where the non-woven fabric has a smooth and a coarse surface, to place the smooth surface against the acid-polyelectrolyte gel 14.

In the illustrative structure, the bottom or negative-facing sheet 15 is spun bonded polypropylene having a thickness of about 0.005 inch; the positive-facing or top sheet 11 is similarly of spun bonded polypropylene but of 0.011 inch thickness. Both layers advantageously are impregnated with a small amount of an acid-resistant surfactant (e.g. sodium lauryl sulfate) to facilitate penetration by water when it is added to the battery. The two sheets 11 and 15 may have weights ranging from about 30 to about 60 grams per square yard, have a fiber size from 0.5 to about 5 denier, and advantageously a resistance below about 8–10 ohm-inch² in 35% sulfuric acid.

According to the invention, to space the acid-polyelectrolyte 14 from the positive plate and to allow electrolyte circulation, auxiliary separators 12 are used. In the preferred embodiment, these auxiliary separators are initially oval-shaped strands of linear-oriented polystyrene, 30 by 60 mils, that are solvent bonded (with methylene chloride) to the positive-facing or top sheet 11. The strands are advantageously located about ¾ inch from each other in parallel rows.

As indicated earlier, one of the advantages of the structure shown in FIG. 2 is that it is readily manufactured on a continuous and automatic basis.

Initially, a substantiallly stoichiometric polyelectrode gel is prepared. To this end, 26 pounds of sodium polystyrene sulfonate (Dow, NASS), a 36% active powder having a molecular weight of $2.39 \times 10^6$ is mixed with 83 pounds of water. When this is fully dispersed, 39 pounds of an aqueous solution of vinyl benzyl trimethyl ammonium chloride (Dow VBTAC), obtained as a 33% active material in aqueous solution and having a molecular weight of 20,000, is added to the NASS.

When the solutions of polyanion and polycation are admixed, a semi-solid gel forms rather rapidly and will separate from the bulk of the mother liquor. Advantageously, however, separation is prevented by milling the mixture above 80° C. In either event, gel is permitted to cure before subsequent processing.

The cured gel is then washed, either batchwise or continuously, with a total of 1,700 pounds of hot water to remove by product salts and unreacted constituents. It is then pressed in an arbor press to remove the bulk of the water, and dried in a vacuum oven to a solid condition. It now represents about 11.7 pounds of stoichiometric polyelectrode complex and about 0.1 pound of un-removed salt.

The product is then extensively mixed in a blade-type mixer with 63 pounds of 100% sulfuric acid, 18 pounds of water, and 7 pounds of fiberglass filler. The resulting material, now viscous and doughy in texture, is extruded through extruder 16 (FIG. 3) as a continuous sheet of acid-polyelectrolyte complex 14.

The assembled separator of FIG. 2 is formed by bonding negative-facing sheet 15 to the bottom of the acid-polyelectrolyte complex gel 14, and the placing on top of this is a positive-facing sheet 11 containing bonded auxiliary separator strands 12.

For bonding of the polystyrene strands constituting the auxiliary separator 12 onto the top sheet of polypropylene non-woven fabric 11, the polystyrene strands are withdrawn from roll 20, heated by passing through boiling water (to remove curliness) in heater 24, and then treated with methylene chloride solvent from wick 25. The same wick 25 likewise treats the mating upper surface of sheet 11, and the respective two surfaces are pressed together by rolls 21, the upper one of which has a series of tracks for aligning the seven strands or ribs constituting separator 12. This material is then conducted to a second heater 26 and then to the final assembly rolls 22.

In the meantime, screw extruder 16 is discharging the acid-polyelectrolyte gel 14 onto the web comprising negative-facing sheet 15. These materials pass along a conveyor 28 to the final assembly rolls 22, where the gel 14 and sheet 15 are bonded to the spacer 12 and sheets 10.

The four-component separator, still in a continuous web, is passed along conveyor 29, pull rolls 30, and then cutting die 31, where the separators are cut and trimmed to size. They are then transmitted to automatic stacker 32, where the final separators 10 are collected in stacks for ultimate shipment to the battery assembly facility.

While the invention has been described in conjunction with various specific embodiments thereof, it is evident that many alternatives, modifications, and variations will be apparent to those skilled in the art in light of the foregoing description. For example, a second set of auxiliary separators 12 may be employed to space the acid-polyelectrolyte layer 14 from the negative plates of a lead-acid storage cell. Also, in lieu of nonforaminous strands 12, a thicker layer of non-woven fabric 11 may be employed as the auxiliary foraminous separator, or other porous materials such as perforated thermoplastic sheets, open pore thermoplastic foams, and the like may be substituted. In any event, the auxiliary foraminous separator should be resistant to sulfuric acid and inert to the electrode with which it is to come into contact.

Similarly, other methods of assembly and use may be envisioned, and a noteworthy feature of the invention is that it provides a structure that is sufficiently versatile to accommodate a variety of requirements.

It is therefore apparent that there has been provided, according to the invention, a unique and advantageous separator for water-activatable, dry-charged lead-acid secondary cells, or other batteries or cells requiring separators having any of the advantageous properties possheets of non-woven polyolefin fabric.

We claim as our invention:

1. In a water-activatable, dry-charged, lead-acid secondary cell having lead peroxide positive electrodes and sponge metallic lead negative electrodes, the improvement comprising, in combination therewith:
   (a) a polyelectrolyte complex of ionically bonded polycationic and polyanionic organic resins positioned between alternate positive and negative electrodes, said complex containing sulfuric acid to provide a sulfuric acid electrolyte upon the addition of water to the cell to thereby activate the cell,
   (b) and an auxiliary separator disposed between said acid-polyelectrode and said positive electrode, said auxiliary separator being resistant to sulfuric acid and inert to said lead peroxide positive electrode, to separate and thereby prevent direct contact between said sulfuric acid-polyelectrolyte and said positive electrodes during storage and prior to activation, and to permit electrolyte circulation within the cell.

2. A secondary cells as set forth in claim 1 wherein said acid-polyelectrolyte complex comprises a sheet of sulfuric acid and polyelectrolyte gel interposed between sheets of non-woven polyolefin fabric.

3. A secondary cell as set forth in claim 1 wherein said auxiliary separator comprises a series of spaced strands or ridges carried by said polyelectrolyte complex separator.

4. A secondary cell as set forth in claim 2 wherein said auxiliary separator is bonded to one of said sheets of non-woven polyolefin fabric.

5. A secondary cell as set forth in claim 3 wherein said strands or ridges are parallel and vertical.

6. A secondary cell as set forth in claim 1 wherein said acid-polyelectrolyte includes a finely divided thicking agent.

7. A secondary cell as set forth in claim 2 wherein said non-woven polyolefin fabric includes a minor amount of an acid-resistant wetting agent.

References Cited

UNITED STATES PATENTS

| | | | |
|---|---|---|---|
| 2,511,887 | 6/1950 | Vinal | 136—145 |
| 3,324,068 | 6/1967 | Michaels | 136—146X |
| 3,340,100 | 9/1967 | Silvestri | 136—146X |
| 3,379,569 | 4/1968 | Berger et al. | 136—145X |
| 2,703,336 | 3/1955 | Lucas | 136—146 |
| 3,328,208 | 6/1967 | Ryhiner et al. | 136—158X |

DONALD L. WALTON, Primary Examiner

U.S. Cl. X.R.

136—145, 153, 157